Aug. 29, 1933. D. S. BARNARD 1,925,066
SPRING CONNECTING MEANS
Filed April 13, 1932

Inventor:
Dean S. Barnard,
By Wm. F. Freudenreich,
Attorney.

Patented Aug. 29, 1933

1,925,066

UNITED STATES PATENT OFFICE 1,925,066

SPRING CONNECTING MEANS

Dean S. Barnard, Hinsdale, Ill., assignor to The Rome Company, Inc., a corporation of New York Application April 13, 1932. Serial No. 604,949

7 Claims. (Cl. 5—269)

It is a common practice in bed springs of a vertical coil type to connect the upper rings or coils of the springs together by means of small helical springs lying in the planes of the upper coils or rings of the main springs. Since there are a great many of these small helical springs, each of which must be attached at both ends to a main spring, it is essential that the fastening or attaching means be simple and easily applied in order that the cost shall not be excessive. The object of the present invention is to produce a novel and extremely simple fastening between the end of a helical spring and a ring or wire, which will require a minimum amount of material, enable the workman to complete a fastening with a minimum amount of effort, and give to the bed spring a neater appearance than has been possible with old types of fastenings.

Figure 1:
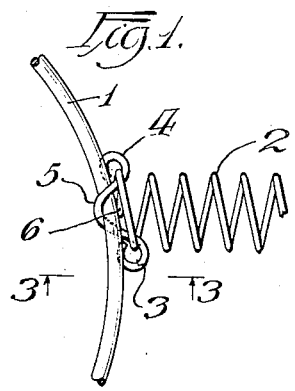
Figure 2:
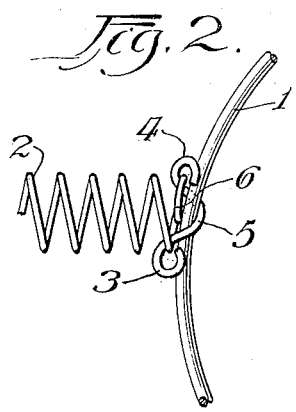
Figure 3:
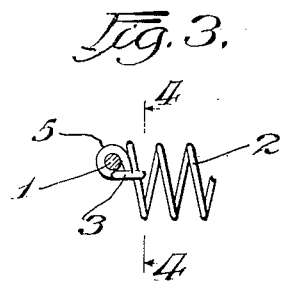
Figure 4:
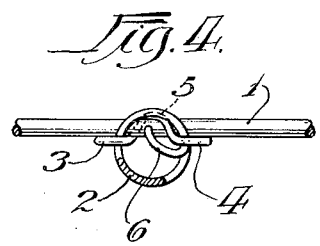
Figure 5:
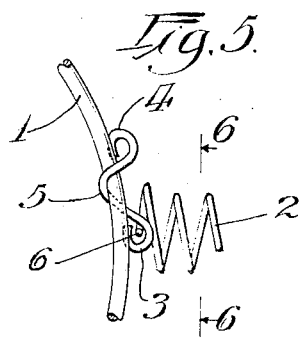
Figure 6:
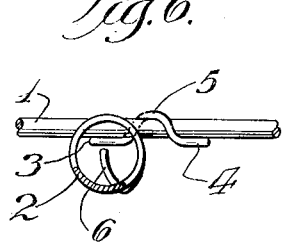

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a top plan view showing fragments of meeting helical and main springs secured together with one of my improved fastenings; Fig. 2 is a bottom view of the parts appearing in Fig. 1; Fig. 3 is a section on line 3—3 of Fig. 1; Fig. 4 is a section on line 4—4 of Fig. 3; Fig. 5 is a view similar to Fig. 1 showing the helical spring in the process of being screwed or threaded into the fastening clip; and Fig. 6 is a view, similar to Fig. 4, showing the parts in the positions in which they appear in Fig. 5 or, in other words, a section on line 6—6 of Fig. 5.

Referring to the drawing, 1 represents the upper ring or coil of a vertical spiral or upholstering spring, and 2 is one of the usual small helical springs of the type employed to connect the upper rings or coils of the main springs together. The spring 2 and the ring 1 should lie in about the same plane or, at least, the helical spring should not project very much above the top of the main spring. In accordance with my invention, I employ a clip composed of two eyes 3 and 4 lying in the same plane and spaced apart from each other a distance about equal to the diameter of the helical spring; the eyes being connected together by a bow-shaped yoke 5 which lies in a plane at right angles to the plane of the eyes and at an angle to a line intersecting the eyes. The main portion of the connecting yoke may be U-shaped or V-shaped, or it may be a part of a helix. In fact, this yoke portion may take any shape as long as it will embrace the wire 1 on the inner side and across the top and bottom and permit the eyes to lie underneath and in contact with the wire of the main spring and project outwardly therefrom far enough to permit the wire of the helical spring to be threaded or screwed through both of the eyes. After the wire of the helical spring has been entered into both of the eyes, the helical spring is given a fraction of a turn and the free end of the wire thereof is then clinched or bent, as indicated at 6, so that the helical spring cannot accidentally become unscrewed. In Figs. 5 and 6 I have shown the clip laid upon the wire of the main spring while the free end of the wire of the helical spring is just being entered into the eye 3. By turning the helical spring about its long axis the wire thereof may be entered into the eye 4 after passing up through the eye 3. The clinching of the wire of the helical spring will ordinarily be done by hand, a tool similar to a pair of pliers being employed. This process may be simplified by deforming the extreme end portions of the helical springs before the assembly thereof in the spring construction is begun. Thus, in Figs. 5 and 6, the endmost half turn of the helical spring has been flattened so as to have a width equal only to about half the diameter of the spring. Very little additional bending of the part 6 is then required to place it in the condition shown in Fig. 4, whereby the helical spring is locked to the clip.

It will be seen that, after the connection between a helical spring and the upper ring or coil of a main spring has been completed, there are no projecting ends above the spring structure or in position to catch on the hands or the bed clothing, because the ends of the wire of which the clip is made may be bent into complete rings or loops of which those portions containing the actual ends of the wire underlie the ring or coil 1. The connection between the springs is a secure one because it is necessary to twist the helical spring through a considerable angle before the clinched end of the wire can be sprung from interlocking engagement with the clip. Furthermore, the connection is very neat and attractive. Most important, perhaps, is the fact that very little material is required in the manufacture of the clip and a minimum amount of work or effort is required to lay a clip against the wire of a main spring, insert the end of a helical spring in one of the eyes and give a half turn or a turn, and then clinch the extreme end portion of the wire of the helical spring.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. The combination with a ring of a spiral spring and a small helical spring lying radially thereof and outwardly therefrom, of a clip having a U-shaped part extending over the top of and under the wire of the ring from the inner side of the latter, said clip having at its ends eyes lying in a plane parallel with the plane of the ring, and spaced apart circumferentially of the ring the inner end of the helical spring being threaded through both of said eyes.

2. The combination with a ring of a spiral spring and a small helical spring extending radially thereof and outwardly therefrom, of a clip having a U-shaped part extending over the top of and under the wire of the ring from the inner side of the latter, said clip having at its ends eyes lying under and in contact with the ring in a plane parallel with the plane of the ring, the inner end of the helical spring being threaded through both of said eyes.

3. The combination with a ring of a spiral spring: of a clip composed of parallel eye portions lying flat against the under side of and projecting outwardly beyond the wire of said ring, and a connecting portion extending from one eye up one side of the said wire, across the top and down the other side to the second eye; and a helical spring having a diameter about equal to the distance between said eyes threaded at one end through said eyes.

4. The combination with a ring of a spiral spring: of a clip composed of parallel eye portions lying flat against the under side of and projecting outwardly beyond the wire of said ring, and a connecting portion extending from one eye up one side of the said wire, across the top and down the other side to the second eye; and a helical spring having a diameter about equal to the distance between said eyes threaded at one end through said eyes and clinched to hold it against withdrawal.

5. The combination with a helical spring and a member extending across one end thereof, of a wire extending partially around said member from the side farthest from the spring; the ends of the wire being spaced apart transversely of the spring and being in the form of eyes lying flat against the under side of said member and projecting therefrom on the side next to the spring, the wire of the adjacent end of the spring being threaded through both eyes.

6. The combination with a helical spring and a member extending across one end thereof, of a wire extending partially around said member from the side farthest from the spring; the ends of the wire being spaced apart transversely of the spring and being in the form of eyes lying flat against the under side of said member and projecting therefrom on the side next to the spring, the wire of the adjacent end of the spring being threaded through both eyes and clinched to lock the spring against separation from the eyes.

7. A clip of the character described comprising a U-shaped wire, the free ends of which are in the form of single rings or eyes lying on the same side of the plane of the U-shaped portion and in a plane at right angles to the aforesaid plane, the plane of the U-shaped part lying at an angle to a line connecting the centers of said rings or eyes.

DEAN S. BARNARD.